United States Patent [19]

Kurtz et al.

[11] 4,203,894
[45] May 20, 1980

[54] AZO DYES CONTAINING SULFONIC ACID GROUPS AND OXDIAZOLYL RADICALS

[75] Inventors: Walter Kurtz, Bad Durkheim; Johannes Dehnert, Ludwigshafen, both of Fed. Rep. of Germany

[73] Assignee: BASF Aktiengesellschaft, Ludwigshafen, Fed. Rep. of Germany

[21] Appl. No.: 879,753

[22] Filed: Feb. 21, 1978

[30] Foreign Application Priority Data

Mar. 5, 1977 [DE] Fed. Rep. of Germany ....... 2709660

[51] Int. Cl.² .................... C09B 29/02; C09B 29/16; C09B 29/30; C09B 29/36
[52] U.S. Cl. .................................. 260/156; 260/154; 260/157; 260/162; 260/163; 548/131; 546/277; 546/288
[58] Field of Search ............... 260/157, 154, 156, 162, 260/163

[56] References Cited

U.S. PATENT DOCUMENTS

| | | | |
|---|---|---|---|
| 3,657,220 | 4/1972 | Kilmuary | 260/207.1 X |
| 3,676,050 | 7/1972 | James | 260/186 X |
| 3,907,769 | 9/1975 | Dehnert et al. | 260/156 |
| 4,083,686 | 4/1978 | Dimroth et al. | 260/152 X |

FOREIGN PATENT DOCUMENTS

| | | | |
|---|---|---|---|
| 2101558 | 7/1972 | Fed. Rep. of Germany | 260/157 |
| 2457687 | 6/1976 | Fed. Rep. of Germany | 260/157 |

OTHER PUBLICATIONS

Venkataraman, *The Chemistry of Synthetic Dyes,* Vol. I, Academic Press Inc.: New York, 1952, pp. 270.

*Primary Examiner*—Floyd D. Higel
*Attorney, Agent, or Firm*—Oblon, Fisher, Spivak, McClelland & Maier

[57] ABSTRACT

Compounds which in the form of the free acids have the formula I

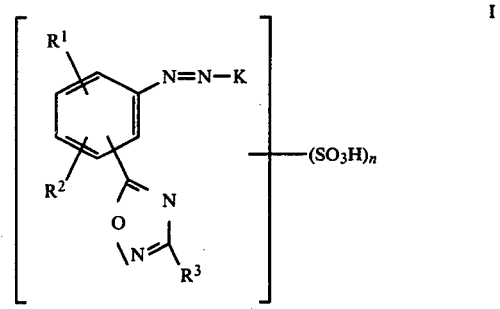

where K is the radical of a coupling component, n is 1, 2 or 3, $R^1$ is hydrogen, chlorine, bromine or hydroxysulfonyl, $R^2$ is hydrogen, chlorine, bromine, nitro, methyl or trifluoromethyl and $R^3$ is hydrogen, alkyl of 1 to 8 carbon atoms (which may or may not be interrupted by oxygen and may be unsubstituted or substituted by hydroxyl, alkoxy of 1 to 8 carbon atoms, phenyl or phenoxy), benzyl, phenylethyl, cyclohexyl, phenyl (which may be unsubstituted or substituted by chlorine, bromine, nitro, methyl, ethyl, methoxy, ethoxy, phenoxy, dialkylamino, where alkyl is of 1 to 4 carbon atoms, or hydroxysulfonyl), naphthyl, pyridyl, thienyl or furyl. The compounds of the formula I may be used for dyeing nitrogen-containing fibers; the dyeings obtained are very fast and have brilliant hues.

10 Claims, No Drawings

AZO DYES CONTAINING SULFONIC ACID GROUPS AND OXDIAZOLYL RADICALS

The present invention relates to compounds which in the form of the free acids correspond to the formula I

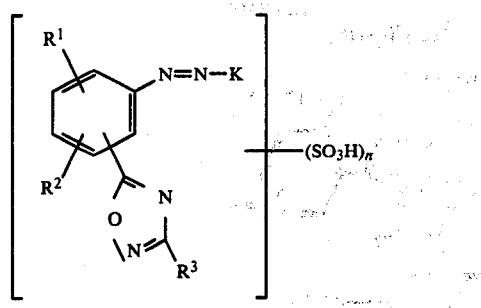

where K is the radical of a coupling component, n is 1, 2 or 3, $R^1$ is hydrogen, chlorine, bromine or hydroxysulfonyl, $R^2$ is hydrogen, chlorine, bromine, nitro, methyl or trifluoromethyl and $R^3$ is hydrogen, alkyl of 1 to 8 carbon atoms (which may or may not be interrupted by oxygen and may be unsubstituted or substituted by hydroxyl, alkoxy of 1 to 8 carbon atoms, phenyl or phenoxy), benzyl, phenylethyl, cyclohexyl, phenyl (which may be unsubstituted or substituted by chlorine, bromine, nitro, methyl, ethyl, methoxy, ethoxy, phenoxy, dialkylamino, where alkyl is of 1 to 4 carbon atoms, or hydroxysulfonyl, naphthyl, pyridyl, thienyl or furyl.

The radicals K of the coupling components are in the main derived from the phenol, aniline, naphthol, naphthylamine, aminonaphthol, acetoacetarylide, pyrazolone, aminopyrazole, pyridone, diaminopyridine, triaminopyridine, diaminopyrimidine, triaminopyrimidine, barbituric acid, quinoline, isoquinoline or indole series.

Specific examples of coupling components are those of the formula

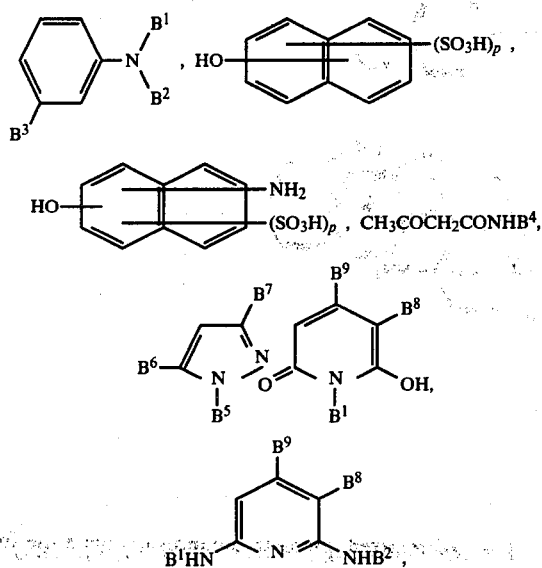

-continued

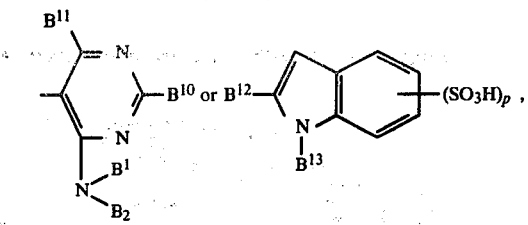

where $B^1$ and $B^2$ independently of one another are hydrogen, alkyl of 1 to 4 carbon atoms, alkyl of 2 to 4 carbon atoms which is substituted by hydroxyl, cyano, alkoxy of 1 to 4 carbon atoms, alkanoyloxy of 1 to 4 carbon atoms or alkoxycarbonyl (where alkoxy is of 1 to 4 carbon atoms), alkyl of 4 to 9 carbon atoms which is interrupted by oxygen and substituted by hydroxyl, alkoxy of 1 to 4 carbon atoms, phenoxy or benzyloxy, cyclohexyl, benzyl, phenylethyl or phenyl, $B^3$ is hydrogen, hydroxysulfonyl, chlorine, methyl or alkanoylamino of 1 to 4 carbon atoms, $B^4$ is phenyl which may be unsubstituted or substituted by hydroxysulfonyl, chlorine, bromine, methyl, ethyl, methoxy or ethoxy, $B^5$ is hydrogen, alkyl of 1 to 4 carbon atoms, cyclohexyl, benzyl or phenyl which may be unsubstituted or substituted by chlorine, bromine, methyl, ethyl or hydroxysulfonyl, $B^6$ is hydroxyl or amino, $B^7$ is hydrogen, methyl, carbamoyl or alkoxycarbonyl where alkoxy is of 1 to 4 carbon atoms), $B^8$ is cyano or carbamoyl, $B^9$ is hydrogen, hydroxyl or methyl, $B^{10}$ is a radical $B^1$ or

$B^{11}$ is a radical $B^1$ or

$B^{12}$ is methyl or phenyl, $B^{13}$ is hydrogen, methyl, β-cyanoethyl, β-hydroxyethyl, β-carboxyethyl or β-carbamoylethyl and p is 0, 1 or 2.

Specific examples of radicals $B^1$ and $B^2$, in addition to those already mentioned, are: $CH_3$, $C_2H_5$, $C_3H_7$, $C_4H_9$, $C_2H_4OH$, $CH_2CHOHCH_3$, $CH_2CHOHCH_2Cl$, $CH_2CH_2CN$, $CH_2CH_2OCH_3$, $CH_2CH_2OC_2H_5$, $CH_2CH_2OC_4H_9$,

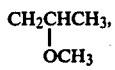

$CH_2CH_2OCOCH_3$, $CH_2CH_2OCOC_2H_5$,
$CH_2CH_2COOCH_3$, $CH_2CH_2COOC_2H_5$,
$CH_2CH_2COOC_4H_9$, $CH_2CH_2OCH_2CH_2OH$,
$(CH_2)_3OCH_2CH_2OH$, $(CH_2)_3O(CH_2)_4OH$, $(CH_2)_3OC_2H_4OCH_3$, $(CH_2)_3OC_2H_4OC_2H_5$, $(CH_2)_3OC_2H_4OC_4H_9$, $(CH_2)_3OC_2H_4OCH_2C_6H_5$, $(CH_2)_3OC_2H_4OC_6H_5$, $(CH_2)_3O(C_2H_4O)_2CH_3$ and $(CH_2)_3O(C_2H_4O)_2C_2H_5$.

Examples of preferred diazo components are:
(1) 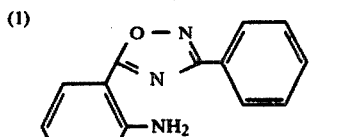
(2) 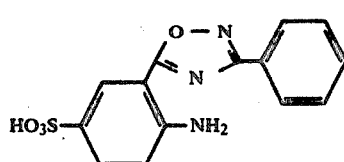
(3) 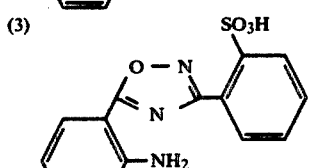
(4) 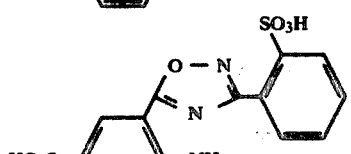
(5) 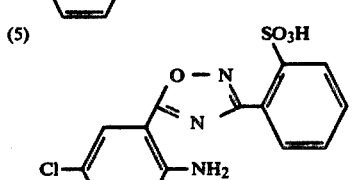
(6) 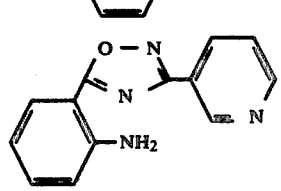
(7) 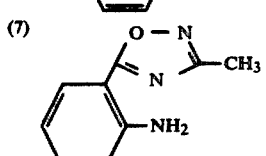
(8) 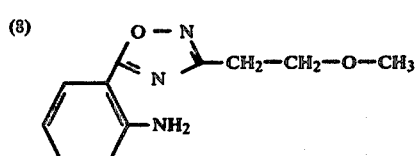
(9) 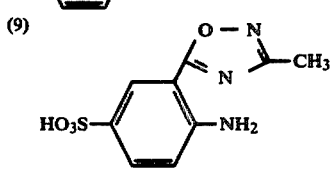
(10) 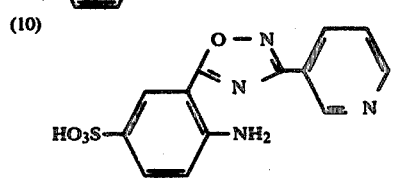
(11) 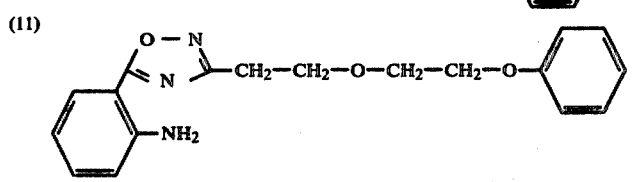
(12) 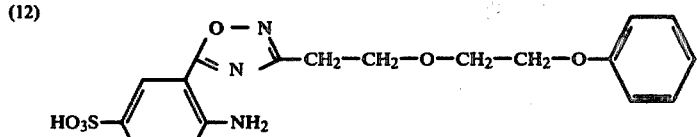
(13) 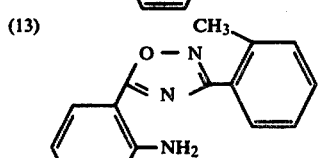
(14) 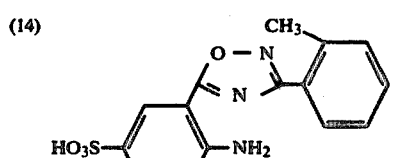
(15) 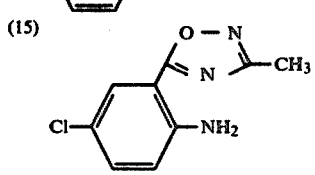
Preferred coupling components have the formulae

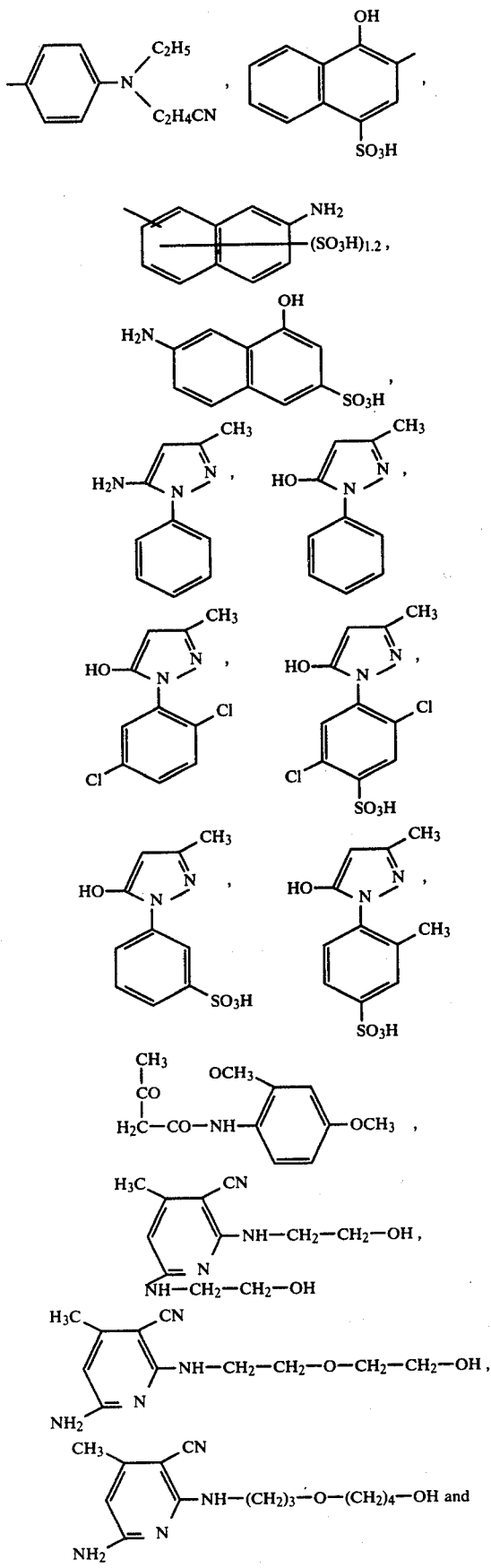
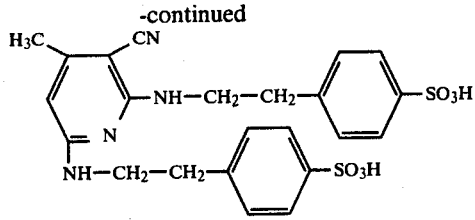

On natural polyamides and synthetic nylons, the dyes of the formula I give yellow to red dyeings with very good lightfastness and wetfastness. The depth of color and the clear hue achievable with many dyes deserve particular mention. The dyes may be used in the form of their alkali metal salts (the alkali metal being Li, Na or K) or of their ammonium salts (where ammonium may be unsubstituted or substituted).

Dyes of particular industrial importance are those of the formula Ia

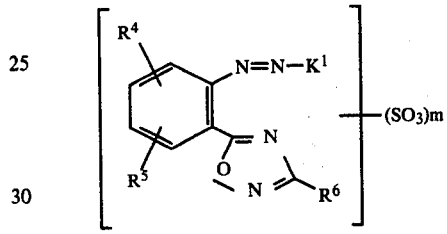

where $R^4$ is hydrogen, chlorine or hydroxysulfonyl, $R^5$ is hydrogen, chlorine or trifluoromethyl, $R^6$ is methyl, alkoxyethyl (where alkoxy is of 1 to 4 carbon atoms), phenoxyethyl, phenyl which may be unsubstituted or substituted by hydroxysulfonyl, or pyridyl, m is 1 or 2 and $K^1$ is a coupling component of the aniline, naphthol, naphthylamine, aminonaphthol, acetoacetarylide, pyrazolone, aminopyrazole, pyridone, diaminopyridine or indole series.

The dyes of the formula I may be manufactured by reacting a diazonium compound of an amine of the formula

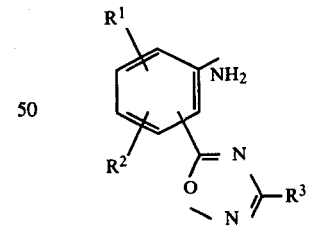

with a coupling component of the formula

HK;

the n sulfonic acid groups may be present in the diazo component and/or in the coupling component.

In the Examples which follow, parts and percentages are by weight, unless stated otherwise.

EXAMPLE 1

A solution of 34 parts of the sodium salt of the formula (2) in 200 parts of water is added to a mixture of 300 parts of ice and 35 parts by volume of 10-molar hydrochloric acid. 30 parts by volume of a 23% strength aqueous sodium nitrite solution is run in under the surface of this mixture at 0°–5° C., stirring is continued for 3 hours at this temperature, and the excess nitrous acid is then destroyed in the conventional manner by adding amidosulfonic acid.

A solution of 25 parts of acetoacetic acid 2,4-dimethoxyanilide in 250 parts by volume of glacial acetic acid is run into the resulting diazotized mixture at 0°–5° C., after which 750 parts by volume of a 55% strength aqueous sodium acetate solution are run in. The dye is filtered off and washed with dilute sodium chloride solution; it is a yellow powder which gives a greenish yellow solution in hot water. On nylon or wool fabrics it gives greenish yellow dyeings with excellent lightfastness and wetfastness.

EXAMPLE 2

A solution of 19 parts of 1-phenyl-3-methyl-5-aminopyrazole in 20 parts of 10-molar hydrochloric acid and 500 parts of water is run slowly, at 0°–5° C., into the diazotized mixture obtained as described in Example 1, paragraph 1, after which 400 parts by volume of a 55% strength aqueous sodium acetate solution are run in. The dye obtained is filtered off and washed with dilute sodium chloride solution and then with a little water. After drying at 100° C., a yellow powder is obtained, which dyes nylon fibers in yellow hues having very good lightfastness and wetfastness.

EXAMPLE 3

A solution of 25 parts of 2,6-bis-(2-hydroxyethylamino)-3-cyano-4-methylpyridine in 15 parts by volume of concentrated hydrochloric acid and 500 parts of water is added gradually, at 0°–5° C., to the diazotized mixture prepared as described in Example 1, paragraph 1, and sufficient saturated sodium acetate solution is then added to give a pH of from 4 to 5. The dye is filtered off after completion of coupling, washed with a little water and dried at 100° C. An orange powder is obtained, which gives a golden yellow solution in hot water and dyes nylon textiles in yellowish orange hues which have very good lightfastness and wetfastness.

EXAMPLE 4

The diazotized mixture obtained as described in Example 1, paragraph 1, is added at 0°–5° C. to a solution of 32 parts of N-ethyl-N-benzyl-aniline-3'-sulfonic acid in 10 parts of 50% strength sodium hydroxide solution and 500 parts of water, 500 parts of ice and 20 parts of sodium carbonate also being added. The dye is precipitated from the resulting solution by adding 1,000 parts by volume of saturated sodium chloride solution and is filtered off, washed with dilute sodium chloride solution and dried. The yellowish brown powder obtained readily dissolves in water and gives orange dyeings, having very good lightfastness and wetfastness, on nylon filaments.

EXAMPLE 5

24 parts of the compound of the formula (1) are dissolved in 250 parts of glacial acetic acid and 50 parts of propionic acid. 32 g of 40% strength nitrosylsulfuric acid are added dropwise at from 0° to 5° C. and the mixture is then stirred for 2 hours at the same temperature. The excess nitrous acid is then destroyed in the conventional manner by adding urea.

The diazotized mixture obtained is added at 0°–5° C. to a mixture which has been obtained by dissolving 26 parts of 2-amino-8-hydroxynaphthalene-6-sulfonic acid in 300 parts of water containing 7.5 parts by volume of 50% strength sodium hydroxide solution, and then adding 60 parts by volume of 10% strength hydrochloric acid and 300 parts of ice to the solution.

Sufficient saturated sodium acetate solution is then slowly added dropwise to the coupling mixture until the pH has reached 2–3.

After completion of coupling, the mixture is neutralized with 50% strength sodium hydroxide solution to a pH of 6–8, and the dye is then filtered off, washed with water and dried. A dark red powder is obtained, which gives a red solution in hot water and dyes nylon fabrics in red hues having very good lightfastness and wetfastness.

EXAMPLE 6

24 parts of the compound of the formula (6) are stirred into 120 parts of water and 40 parts of concentrated hydrochloric acid at room temperature. The mixture is then made up to 500 parts by volume with water and ice. After adding 30 parts by volume of a 23% strength sodium nitrite solution of from 5° to 10° C., the mixture is stirred for 2 hours and excess nitrous acid is destroyed in the conventional manner.

The diazonium salt solution thus obtained is coupled with 26 parts of 2-amino-8-hydroxynaphthalene-6-sulfonic acid by the method described in Example 5, paragraph 2. The dye thus obtained gives red dyeings, having very good lightfastness and wetfastness, on nylon fabrics.

If the methods described in the preceding Examples are followed, starting from the components indicated in the Table, the corresponding dyes are obtained.

| Example | R | Diazo component: 2-(3-R-1,2,4-oxadiazol-5-yl)aniline | Coupling component | Hue of a dyeing on nylon |
|---|---|---|---|---|
| 7 | CH₃ | | 6-amino-4-hydroxynaphthalene-2-sulfonic acid | red |
| 8 | —CH₂—CH₂—O—CH₃ | | " | " |
| 9 | —CH₂—CH₂—O—CH₂—CH₂—OCH₃ | | " | " |
| 10 | —CH₂—CH₂—O—CH₂—CH₂—O—phenyl | | " | " |
| 11 | 4-methoxyphenyl | | " | " |
| 12 | 4-methylphenyl | | " | " |
| 13 | 2-methylphenyl | | " | " |
| 14 | 2-chlorophenyl | | " | " |
| 15 | —CH₂—CH₃ | | " | " |
| 16 | —CH₂—phenyl | | " | " |
| 17 | —CH(CH₃)₂ | | " | " |
| 18 | 4-chlorophenyl | | " | " |

| Example | Diazo component | Coupling component | Hue |
|---|---|---|---|
| 19 | ![phenyl-C(=N-O-N=C-phenyl)- attached to phenyl ring with NH2 and OCH3] | 7-amino-1-hydroxy-naphthalene-3-sulfonic acid (NH2, HO, SO3H on naphthalene) | red |
| 20 | ![phenyl-C(=N-O-N=C)-phenyl-NH2] | " | red |
| 21 | ![N=C(phenyl)-O-N=C attached to phenyl with Cl, NH2, SO3H] | " | red |
| 22 | Formula (1) | 3-methyl-5-hydroxy-1-(4-sulfophenyl)pyrazole | yellow |
| 23 | " | " | yellow |
| 24 | " | 3-methyl-5-hydroxy-1-(2-methyl-4-sulfophenyl)pyrazole | yellow |
| 25 | " | " | yellow |
| 26 | " | 3-methyl-5-hydroxy-1-(2-chloro-5-sulfophenyl)pyrazole | yellow |

-continued

| Example | Diazo component | Coupling component | Hue |
|---|---|---|---|
| 27 | " | 3-amino-naphthalene-2,5-disulfonic acid (H$_2$N, SO$_3$H on one ring; HO$_3$S on other) | orange |
| 28 | " | 2-amino-naphthalene-5,8-disulfonic acid (NH$_2$, SO$_3$H; HO$_3$S) | orange |
| 29 | " | 3-methyl-5-amino-1-(4-sulfophenyl)pyrazole | yellow |
| 30 | " | 3-methyl-5-amino-1-(3-sulfophenyl)pyrazole | yellow |
| 31 | " | 4-methyl-3-cyano-2,6-bis[(4-sulfophenethyl)amino]pyridine | yellowish orange |
| 32 | " | 1,2-dimethyl-indole-5-sulfonic acid | yellow |
| 33 | " | CH$_3$—CO—CH$_2$—CO—NH—(2,5-dimethoxy-4-sulfophenyl) | yellow |

| Example | Diazo component | Coupling component | Hue |
|---|---|---|---|
| 34 | '' | ![naphthalene with OH and SO₃H] | yellowish red |
| 35 | Formula (7) | ![pyrazolone with CH₃, HO, N-N, 2,5-dichlorophenyl-SO₃H] | yellow |
| 36 | Formula (8) | '' | yellow |
| 37 | Formula (6) | '' | yellow |
| 38 | '' | ![pyrazolone with CH₃, HO, N-N, phenyl-3-SO₃H] | yellow |
| 39 | '' | ![pyrazole with CH₃, H₂N, N-N, phenyl-4-SO₃H] | '' |
| 40 | '' | ![pyridine with CH₃, CN, two NH-CH₂-CH₂-C₆H₄-SO₃H groups] | yellowish orange |
| 41 | '' | ![phenyl with N(C₂H₅)₂ and SO₃H] | orange |
| 42 | '' | ![naphthalene with OH and SO₃H] | yellowish red |

-continued

| Example | Diazo component | Coupling component | Hue |
|---|---|---|---|
| 43 | Formula (2) | CH₃COCH₂CONH-(2-OCH₃, 4-OCH₃, 5-Cl phenyl) | yellow |
| 44 | " | CH₃COCH₂CONH-(2-OCH₃, 5-CH₃ phenyl) | yellow |
| 45 | " | CH₃COCH₂CONH-(2-OCH₃ phenyl) | yellow |
| 46 | " | 5-amino-1-phenylpyrazole | yellow |
| 47 | " | 5-amino-1-cyclohexylpyrazole | yellow |
| 48 | " | 5-amino-1-benzylpyrazole | yellow |
| 49 | " | 3-methyl-1-phenyl-5-hydroxypyrazole | yellow |
| 50 | " | 3-methyl-1-(2-methylphenyl)-5-hydroxypyrazole | " |

| Example | Diazo component | Coupling component | Hue |
|---|---|---|---|
| 51 | " | 3-methyl-1-(2-chlorophenyl)-5-hydroxypyrazole | " |
| 52 | " | N-ethyl-N-(3-sulfobenzyl)aniline | orange |
| 53 | " | 6-amino-1-hydroxy-naphthalene-3-sulfonic acid | red |
| 54 | " | 2,6-bis[(2-(2-hydroxyethoxy)ethyl)amino]-4-methyl-3-cyanopyridine | yellowish orange |
| 55 | " | 6-amino-2-(2-hydroxyethylamino)-4-methyl-3-cyanopyridine | yellow |
| 56 | " | 6-amino-2-[(2-(2-hydroxyethoxy)ethyl)amino]-4-methyl-3-cyanopyridine | yellow |
| 57 | " | 3-ethoxycarbonyl-5-hydroxy-1-phenylpyrazole | yellow |
| 58 | " | 3-carbamoyl-5-hydroxy-1-phenylpyrazole | yellow |

-continued

| Example | Diazo component | Coupling component | Hue |
|---|---|---|---|
| 59 | Formula (3) | CH₃-CO-CH₂-CO-NH-(2,4-dimethoxyphenyl) | yellow |
| 60 | " | 3-methyl-1-phenyl-5-hydroxypyrazole | yellow |
| 61 | " | 3-methyl-1-(2-methylphenyl)-5-hydroxypyrazole | yellow |
| 62 | " | 3-methyl-1-(2,5-dichlorophenyl)-5-hydroxypyrazole | yellow |
| 63 | " | 5-amino-3-methyl-1-phenylpyrazole | yellow |
| 64 | " | 5-amino-1-benzylpyrazole | yellow |
| 65 | " | 3-(N-ethyl-N-phenylaminomethyl)benzenesulfonic acid | orange |
| 66 | " | 6-amino-1-naphthalenesulfonic acid | yellowish red |

-continued

| Example | Diazo component | Coupling component | Hue |
|---|---|---|---|
| 67 | " | ![structure: 4-methyl-3-cyano-2-(2-hydroxyethylamino)-6-(2-hydroxyethylamino)pyridine] | yellowish orange |
| 68 | " | ![structure: 4-methyl-3-cyano-2-(2-(2-hydroxyethoxy)ethylamino)-6-(2-(2-hydroxyethoxy)ethylamino)pyridine] | yellowish orange |
| 69 | " | ![structure: 1-methyl-2-phenylindole-5-sulfonic acid] | yellow |
| 70 | " | ![structure: 4-methyl-3-cyano-2-(2-(2-hydroxyethoxy)ethylamino)-6-aminopyridine] | yellow |
| 71 | " | ![structure: acetoacetic acid 2,4-dimethoxyanilide] | yellow |
| 72 | " | ![structure: 3-methyl-1-phenyl-5-pyrazolone] | yellow |
| 73 | " | ![structure: 3-methyl-1-(2-methylphenyl)-5-pyrazolone] | yellow |
| 74 | " | ![structure: 3-methyl-1-(2,5-dichlorophenyl)-5-pyrazolone] | yellow |

-continued

| Example | Diazo component | Coupling component | Hue |
|---|---|---|---|
| 75 | " | 3-methyl-5-amino-1-phenylpyrazole | yellow |
| 76 | " | 3-amino-1-benzylpyrazole (H₂N, N-CH₂-phenyl) | yellow |
| 77 | " | N-ethyl-N-phenyl-aminomethyl-benzenesulfonic acid | orange |
| 78 | " | 6-amino-naphthalene-1-sulfonic acid | yellowish red |
| 79 | " | 4-methyl-3-cyano-2,6-bis(2-hydroxyethylamino)pyridine | yellowish orange |
| 80 | " | 4-methyl-3-cyano-2,6-bis[2-(2-hydroxyethoxy)ethylamino]pyridine | yellowish orange |
| 81 | " | 2-phenyl-1-methylindole-5-sulfonic acid | yellow |
| 82 | " | 4-methyl-3-cyano-6-amino-2-[2-(2-hydroxyethoxy)ethylamino]pyridine | yellow |

-continued

| Example | Diazo component | Coupling component | Hue |
|---|---|---|---|
| 83 | Formula (4) | 5-hydroxy-1,3-diphenylpyrazole | yellow |
| 84 | " | 1-(2,5-dichlorophenyl)-3-methyl-5-hydroxypyrazole | yellow |
| 85 | " | 5-amino-1-(2,5-dichlorophenyl)-3-methylpyrazole | yellow |
| 86 | $CH_3CO-CH_2-CO-NH-$(2,4-dimethoxyphenyl) | | yellow |
| 87 | " | 2-phenylindole | " |
| 88 | " | 1-methyl-2-phenylindole | yellow |
| 89 | " | 4-methyl-3-cyano-2-[NH—(CH$_2$)$_3$—O—(CH$_2$)$_2$OH]-6-[NH—(CH$_2$)$_3$—O—(CH$_2$)$_2$—OH]pyridine | yellowish orange |
| 90 | " | 4-methyl-3-cyano-2-[NH—CH$_2$—CH$_2$—OH]-6-[NH—(CH$_2$)$_3$—O—(CH$_2$)$_2$—O—phenyl]pyridine | yellowish orange |

| Example | Diazo component | Coupling component | Hue |
|---|---|---|---|
| 91 | 5-(2-aminophenyl)-3-(2-naphthyl)-1,2,4-oxadiazole | 3-amino-5,8-disulfo naphthalene (HO₃S at 5, SO₃H at 8, NH₂) | orange |
| 92 | " | 6-amino-4-hydroxy-naphthalene-2,7-disulfonic acid | red |
| 93 | " | 1-(2,5-disulfophenyl)-3-methyl-5-hydroxypyrazole | yellow |
| 94 | 5-(2-aminophenyl)-3-(1-naphthyl)-1,2,4-oxadiazole | 1-(5,8-disulfonaphthyl)-3-methyl-5-hydroxypyrazole | yellow |
| 95 | " | 3-amino-5,8-disulfonaphthalene | orange |
| 96 | 5-(2-amino-4-trifluoromethylphenyl)-3-phenyl-1,2,4-oxadiazole | 6-amino-1-hydroxynaphthalene-3-sulfonic acid | red |

-continued

| Example | Diazo component | Coupling component | Hue |
|---|---|---|---|
| 97 | " | 3-methyl-5-hydroxy-1-(4-sulfophenyl)pyrazole | yellow |
| 98 | " | 3-methyl-5-amino-1-(4-sulfophenyl)pyrazole | " |
| 99 | 2-amino-5-trifluoromethylphenyl-3-phenyl-1,2,4-oxadiazole | 2-amino-naphthalene-3,8-disulfonic acid (HO₃S at 8-position, NH₂ and SO₃H on other ring) | orange |
| 100 | 2-amino-5-chlorophenyl-3-phenyl-1,2,4-oxadiazole | " | " |
| 101 | " | 3-methyl-5-hydroxy-1-(3-sulfophenyl)pyrazole | yellow |
| 102 | " | 4-methyl-3-cyano-2,6-bis[(4-sulfophenethyl)amino]pyridine | yellowish orange |
| 103 | " | 3,5-dimethoxy-4-sulfo-acetoacetanilide derivative | yellow |

-continued
| Example | Diazo component | Coupling component | Hue |
|---|---|---|---|
| 104 | Formula (5) | 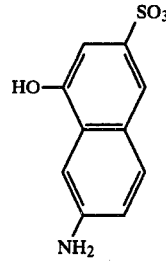 | red |
| 105 | " | 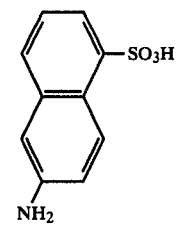 | orange |
| 106 | " | 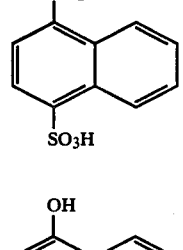 | " |
| 107 | " | 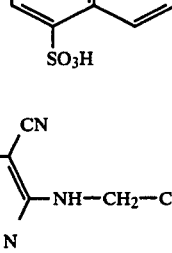 | yellowish red |
| 108 | " | 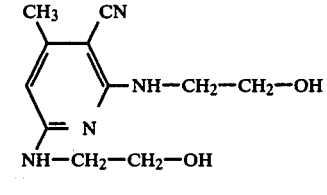 | yellowish orange |
| 109 | " | 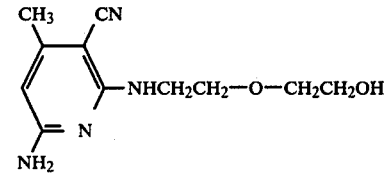 | yellowish orange |
| 110 | " | 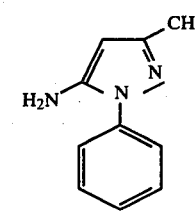 | yellowish orange |

-continued

| Example | Diazo component | Coupling component | Hue |
|---|---|---|---|
| 111 | 3-(2-methylphenyl)-5-(4-aminophenyl)-1,2,4-oxadiazole | 3-methyl-5-hydroxy-1-(4-sulfophenyl)pyrazole | yellow |
| 112 | " | 3-methyl-5-amino-1-(3-sulfophenyl)pyrazole | " |
| 113 | " | 2-amino-3,8-naphthalenedisulfonic acid (7-amino-naphthalene with SO₃H at 2 and 8) | orange |
| 114 | Formula 14 | 4-hydroxy-7-amino-naphthalene-2-sulfonic acid | red |
| 115 | " | acetoacetic acid 2,4-dimethoxyanilide | yellow |
| 116 | " | 3-methyl-5-amino-1-phenylpyrazole | yellow |
| 117 | " | 4-methyl-3-cyano-2,6-bis(2-hydroxyethylamino)pyridine | yellowish orange |

-continued

| Example | Diazo component | Coupling component | Hue |
|---|---|---|---|
| 118 | " | 3-(N-ethyl-N-phenylamino-methyl)benzenesulfonic acid (N-ethyl-N-phenyl-aminomethyl-benzene-SO₃H) | orange |
| 119 | " | 4-hydroxynaphthalene-1-sulfonic acid | yellowish red |
| 120 | 2-amino-5-trifluoromethylphenyl-1,3,4-oxadiazole with 3-pyridyl substituent | 7-amino-4-hydroxynaphthalene-2-sulfonic acid | red |
| 121 | " | 1-(2-methyl-5-sulfophenyl)-3-methyl-5-hydroxypyrazole | yellow |
| 122 | 2-amino-5-trifluoromethylphenyl-1,3,4-oxadiazole with 4-sulfophenyl substituent | 3-(N-ethyl-N-phenylaminomethyl)benzenesulfonic acid | orange |
| 123 | " | 7-amino-4-hydroxynaphthalene-2-sulfonic acid | red |
| 124 | " | 1-phenyl-3-methyl-5-aminopyrazole | yellow |
| 125 | " | acetoacetic acid 2,4-dimethoxyanilide | " |

-continued

| Example | Diazo component | Coupling component | Hue |
|---|---|---|---|
| 126 | " | 2-amino-3-cyano-4-methyl-6-(2-hydroxyethoxyethylamino)pyridine structure: pyridine ring with CH₃ at 4, CN at 3, NH-CH₂-CH₂-OCH₂CH₂OH at 6, NH₂ at position, N in ring | " |
| 127 | 2-(3-amino-4-methoxyphenyl)-5-phenyl-1,3,4-oxadiazole | 1-(3-sulfophenyl)-3-methyl-5-aminopyrazole | yellow |
| 128 | 2-(2-amino-3,5-dichlorophenyl)-5-phenyl-1,3,4-oxadiazole | 1-(2,4-disulfophenyl)-3-methyl-5-hydroxypyrazole | yellow |
| 129 | " | 2-amino-8-hydroxysulfo-naphthalene (3-amino-2-naphthol-type: HO₃S at 8, NH₂ and SO₃H on other ring) | yellowish red |
| 130 | Formula (2) | N,N-bis(2-hydroxyethyl)aniline | yellow |
| 131 | " | 3-chloro-N,N-bis(2-hydroxyethyl)aniline | yellowish orange |
| 132 | " | 3-methyl-N,N-bis(2-hydroxyethyl)aniline | orange |
| 133 | " | 3-methyl-5-acetylamino-N,N-bis(2-hydroxyethyl)aniline (NHCOCH₃ substituent) | yellowish red |

-continued

| Example | Diazo component | Coupling component | Hue |
|---|---|---|---|
| 134 | " | 3-(N,N-diethylamino)benzenesulfonic acid derivative (N(C₂H₅)₂ group with SO₃H on benzene) | yellow |
| 135 | " | diphenylamine (C₆H₅-NH-C₆H₅) | orange |
| 136 | 5-chloro-2-amino benzene with oxadiazole-CH₃ substituent | 4-hydroxy-7-amino-naphthalene-2-sulfonic acid | red |
| 137 | " | 3-methyl-5-hydroxy-1-(2,5-dichloro-4-sulfophenyl)pyrazole | yellow |
| 138 | " | 4-hydroxy-naphthalene-1-sulfonic acid | yellowish red |
| 139 | " | 2-phenyl-1-methyl-indole-5-sulfonic acid | yellow |
| 140 | 2-amino-5-sulfo benzene with oxadiazole-CH₃ substituent | 4-methyl-3-cyano-6-(2-hydroxyethylamino)-2-(2-hydroxyethylamino)pyridine | yellow |
| 141 | " | 5-hydroxy-7-amino-naphthalene-2-sulfonic acid | red |
| 142 | " | 4-methyl-3-cyano-6-(2-hydroxyethylamino)-2-(2-methoxyethylamino)pyridine | yellow |

-continued

| Example | Diazo component | Coupling component | Hue |
|---|---|---|---|
| 143 | " | 2,6-bis(NHCH₂CH₂OCH₂CH₂OH)-3-cyano-4-methylpyridine | yellow |
| 144 | " | CH₃-CO-CH₂-CONH-(2-OCH₃, 4-OCH₃, 5-Cl phenyl) | yellow |
| 145 | " | 5-amino-3-methyl-1-phenylpyrazole | yellow |
| 146 | " | 5-hydroxy-3-methyl-1-phenylpyrazole | yellow |
| 147 | " | 1-(2,5-dichloro-4-sulfophenyl)-3-methyl-5-hydroxypyrazole | yellow |
| 148 | " | 1-(ethylamino)naphthalene | bluish red |

| Example | Dye | Hue |
|---|---|---|
| 149 | NaO₃S-C₆H₃(methyloxadiazolyl-CH₂OCH₃)-N=N-[4-CH₃, 3-CN, 2-NH-CH₂CH₂CH₂OCH₃, 6-NH-CH₂CH₂CH₂OCH₃-pyridyl] | golden yellow |
| 150 | NaO₃S-C₆H₃(methyloxadiazolyl-CH₂OCH₃)-N=N-[4-CH₃, 3-CN, 2-NH-CH₂CH₂CH₂OCH₃, 6-NH-CH₂CH₂CH₂OCH₃-pyridyl] | reddish yellow |

| Example | Dye | Hue |
|---|---|---|
| 151 | 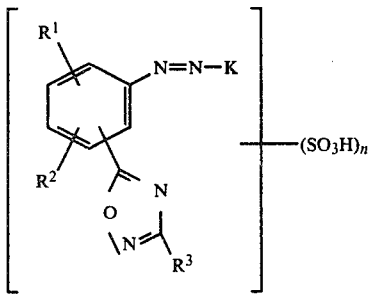 | " |
| 152 | | orange |
| 153 | | bluish red |
| 154 | | dull bluish red |

We claim:

1. An acid azo dye which in the form of the free acid has the formula

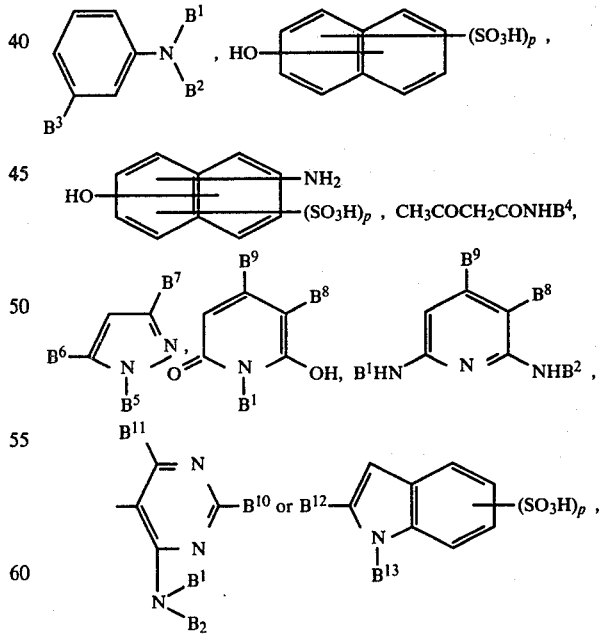

where
$R^1$ is hydrogen, chlorine or bromine,
$R^2$ is hydrogen, chlorine, bromine, nitro, methyl or trifluoromethyl,
$R^3$ is hydrogen; $C_1$ to $C_8$ alkyl; $C_1$ to $C_8$ alkyl substituted by hydroxy, $C_1$ to $C_8$ alkoxy or phenoxy; $C_2$ to $C_8$ alkyl interrupted by oxygen and substituted by hydroxy or phenyl; benzyl; phenylethyl; cyclohexyl; phenyl; phenyl substituted by chlorine, bromine, nitro, methyl, ethyl, methoxy, ethoxy, phenoxy or di-$C_1$ to $C_4$-alkylamino; naphthyl; pyridyl; thienyl; or furyl;
n is 1, 2 or 3 and
K is where $B^1$ and $B^2$ independently of one another are hydrogen; $C_1$ to $C_4$ alkyl; $C_2$ to $C_4$ alkyl substituted by hydroxy, cyano, $C_1$ to $C_4$ alkoxy, $C_1$ to $C_4$ alkanoyloxy or $C_1$ to $C_4$ alkoxycarbonyl; $C_3$ to $C_9$ alkyl interrupted by oxygen and substituted by hydroxy or phenyl; cyclohexyl; benzyl; phenylethyl or phenyl;

$B^3$ is hydrogen, chlorine, methyl, $C_1$ to $C_4$ alkanoylamino or hydroxysulfonyl, $B^4$ is phenyl or phenyl substituted by chlorine, bromine, methyl, ethyl, methoxy or ethoxy, $B^5$ is hydrogen, $C_1$ to $C_4$ alkyl, cyclohexyl, benzyl, phenyl or phenyl substituted by chlorine, bromine, methyl or ethyl, $B^6$ is hydroxy or amino, $B^7$ is hydrogen, methyl, carbamoyl or $C_1$ to $C_4$ alkoxycarbonyl, $B^8$ is cyano or carbamoyl, $B^9$ is hydrogen, hydroxy or methyl, $B^{10}$ is $B^1$ or

$B^{11}$ is $B^1$ or

$B^{12}$ is methyl or phenyl, $B^{13}$ is hydrogen, methyl, β-cyanoethyl, β-hydroxyethyl, β-carboxyethyl or β-carbamoylethyl and p is 0, 1 or 2 and the n hydroxysulfonyl groups are present in the radicals $R^3$ or K or in the ring bearing the substituents $R^1$ and $R^2$.

2. A dye according to the formula in claim 1, in which $R^1$ is hydrogen.

3. A dye according to the formula in claim 1, in which $R^1$ is hydrogen and $R^2$ is hydrogen, chlorine, nitro or trifluoromethyl.

4. A dye according to the formula in claim 1, in which $R^3$ is $C_1$ to $C_4$ alkyl, $C_1$- to $C_4$ alkyl substituted by $C_1$ to $C_8$ alkoxy, phenoxy, benzyloxy or phenylethoxy, phenyl or phenyl substituted by chlorine, methyl, methoxy or ethoxy.

5. A dye according to the formula in claim 1, in which
K is

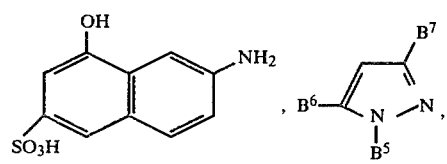

-continued

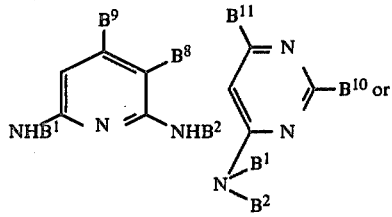

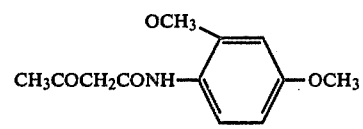

$B^1$ to $B^{11}$ having the meanings given in claim 1.

6. The dye according to claim 1 of the formula

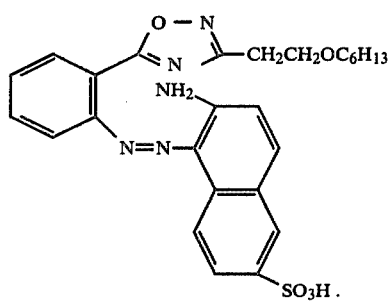

7. The dye according to claim 1 of the formula

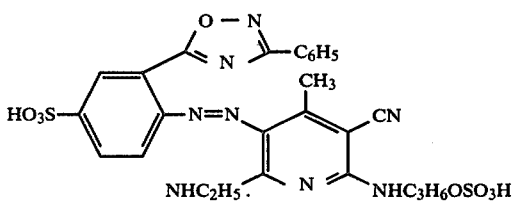

8. The dye according to claim 1 of the formula

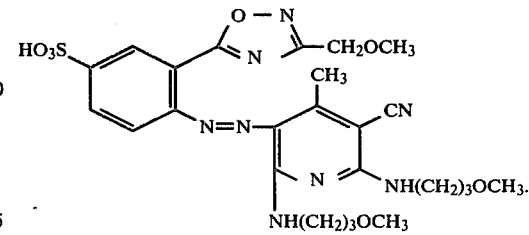

9. The dye according to claim 1 of the formula

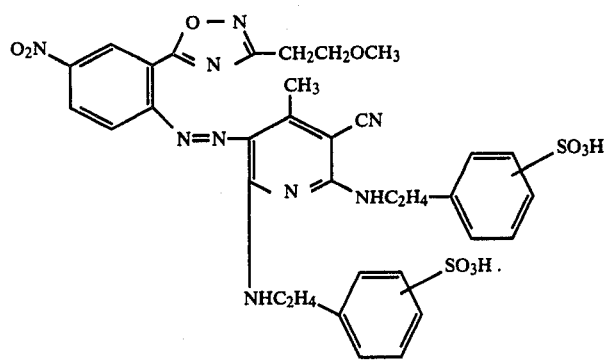
10. The dye according to claim 1 of the formula
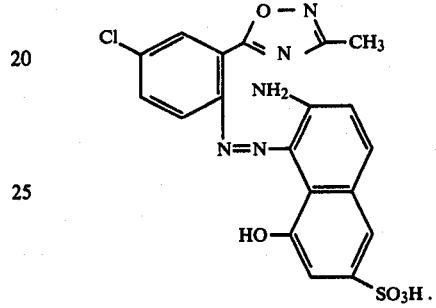
* * * * *